June 8, 1965  W. LÖDIGE ETAL  3,187,946
APPARATUS FOR DOSING A LOOSE SOLID MATERIAL AND FURTHER
POURABLE SUBSTANCES AT CONTINUOUSLY
CONSTANT PROPORTIONS
Filed June 25, 1964  2 Sheets-Sheet 1

INVENTORS
WILHELM LÖDIGE
FRITZ LÖDIGE
JOSEF LUCKE
GEORG OHSE
BY
Alman A. Nelson
ATT'Y June 8, 1965   W. LÖDIGE ETAL   3,187,946
APPARATUS FOR DOSING A LOOSE SOLID MATERIAL AND FURTHER
POURABLE SUBSTANCES AT CONTINUOUSLY
CONSTANT PROPORTIONS
Filed June 25, 1964   2 Sheets-Sheet 2

INVENTORS
WILHELM LÖDIGE
FRITZ LÖDIGE
JOSEF LUCKE
GEORG OHSE
BY
Almon S. Nelson
ATT'Y.

3,187,946
APPARATUS FOR DOSING A LOOSE SOLID MATERIAL AND FURTHER POURABLE SUBSTANCES AT CONTINUOUSLY CONSTANT PROPORTIONS

Wilhelm Lödige, 9c Elsener Strasse; Fritz Lödige, 9b Elsener Strasse; and Josef Lücke, 13 Im Lohfeld, all of Paterborn, Germany; and Georg Ohse, Neuenbeken, Germany; said Ohse assignor to said Wilhelm Lödige, said Fritz Lödige, and said Josef Lücke
Filed June 25, 1964, Ser. No. 377,802
Claims priority, application Germany, June 29, 1963, L 45,237
8 Claims. (Cl. 222—57)

This invention relates to apparatus for dosing a loose solid material and further pourable substances, i.e., one or more liquids and/or other loose solid materials, at continuously constant proportions.

A common problem of continuous prcesses is the dosing of several substances such as a loose solid (fibrous, pulverulent, granular or chip-like) material and a liquid or several loose materials at continuously constant proportions. The delivery rates of the components must automatically adjust themselves with infinite variation to the overall output of the whole process while at the same time the proportions of the different components to each other must be kept constant or the process itself must be kept uniform and yet infinitely variable as to quantity while the proportions of the components are again kept constant.

Apparatus for dosing a loose material and one or more liquids or other loose materials at continuously constant proportions are already known. Thus, for example, rhythmically operated weighing machines are coupled to a dosing pump in such a manner that after a certain number of pump revolutions, a container of the weighing machine discharges a predetermined quantity of the loose material or materials. Although these intermittently delivered quantities can be substantially equalized by additional devices, such devices are not suitable in all cases. It is also known to employ a weighing machine comprising a band which supplies a stream of material which is uniform in weight and to drive a pump or a conveyor band separately at a suitably adjusted speed of rotation by means of a suitable electrical control device and tachometer machines, electric transmissions or electronic controls such that the proportion is always constant since the speed of the band and the speed of the pump or of the second conveyor band remain in proportion. These arrangements are complicated in construction as well as being expensive and liable to faults in operation.

It is, therefore, an object of the present invention to provide an improved apparatus for dosing a loose solid material and further pourable substances at continuously constant proportions.

Further objects of the present invention and advantages thereof will become apparent as the description proceeds.

According to the invention, there is provided an apparatus for dosing a loose solid material and at least one further pourable material, i.e., one or more liquids and/or other loose solid materials at constinously constant proportions, comprising a beam balance on which an endless conveyor belt running over two rollers is arranged, at least one further dosing device for the liquids and/or other loose solid materials arranged outside the weighing system of the beam balance, wherein an infinitely variable drive means common to all the dosing devices is arranged within or outside the weighing system of the band balance, the transmission of kinetic energy from the drive to the endless conveyor belt of the band balance situated within the weighing system where said drive means is arranged outside the weighing system, or to the other dosing devices situated outside the weighing system where said drive means is arranged within the weighing system, being effected through a rotatable transmission whose axis of rotation is arranged parallel and close to the axis of rotation of the beam of the band balance or, preferably, coincides with it, and the speed of the endless belt of the band balance or of the supply of loose material to the endless conveyor belt of the band balance is regulated in dependence on the deflections of the balance beam of the band balance or of an arm connected thereto. By this arrangement, kinetic energy can be transmitted from the weighing system of the band balance or into it in a technically simple manner without any significant impairment of the weighing result. To maintain correct proportions between the different materials to be dosed, the drive of the conveyor belt of the band balance is regulated in known manner in dependence on the deflection of the weighing beam of the band balance or of an arm connected thereto in case where the device for delivering the loose solid material to the endless conveyor belt of the band balance is at a constant speed, whereas in cases where the drive for said endless conveyor belt is at constant speed, it is the rate of delivery of material to said conveyor belt of the band balance which is regulated in this way. In a preferred embodiment of the invention, the conveyor belt is arranged on one of the two lever arms of the band balance, preferably in such a manner that it runs in the direction of the longitudinal axis of the beam of the balance and, preferably, that one roller of the endless conveyor belt of the band balance and the transmission means and, preferably, the beam balance too are arranged on the same axis of rotation. This provides a particularly simple construction of the apparatus of the invention. On the other hand, the endless conveyor belt may also be arranged further to the outside on the lever arm of the weighing beam, one of the rollers of the endless conveyor belt being driven in a suitable manner by the transmission means.

If the drive means is arranged within the weighing system of the band balance, it is preferably arranged on the free lever arm of the band balance to compensate for the weight of the endless conveyor belt. A suitable infinitely variable drive for the purpose of the invention is, for example, an electric motor and an infinitely variable transmission gear which can be adjusted by another electric motor (servo motor) or a variable speed motor. The servo motor or the variable speed motor is switched on or off in the required sense of rotation in known manner by means of two limit switches or the like between which the beam of the band balance or an arm connected thereto oscillates. On the other hand, the supply of loose material on to the endless conveyor belt which moves at constant speed may be controlled by such an infinitely variable transmission which is controlled in the same manner. The belt of the band balance can be adjusted to the required speed either by hand or by the push-button control.

The limit switches may, for example, be optical or mechanical limit switches or other suitable electric devices, such as pairs of electric switch contacts which may be connected by the conductive end of said arm when contacting the same.

The apparatus according to the invention is distinguished from known apparatus in that the production costs are very low owing to the simple mechanical means employed, that the delivery of material is of a high degree of accuracy for continuous processes, that the arrangement can be supervised and repaired even by workers with no specialized technical skill and that it can be made very robust in construction and not at all liable to disturbance.

Figure 1:
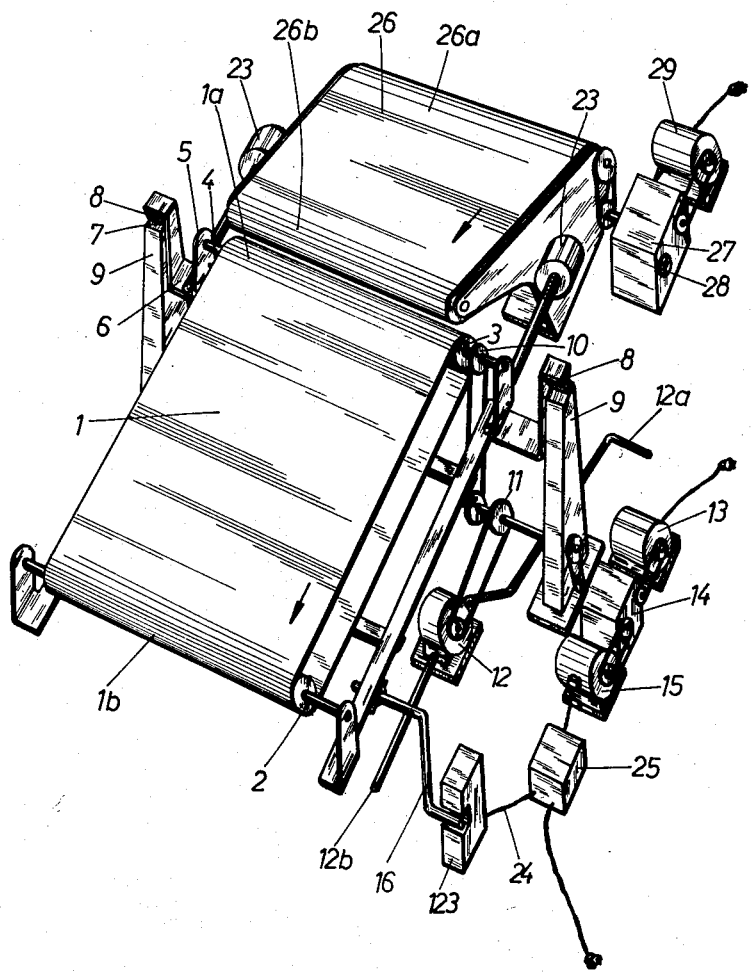
FIG. 1 shows a perspective view of a preferred embodiment of the apparatus of the present invention.
Figure 2:
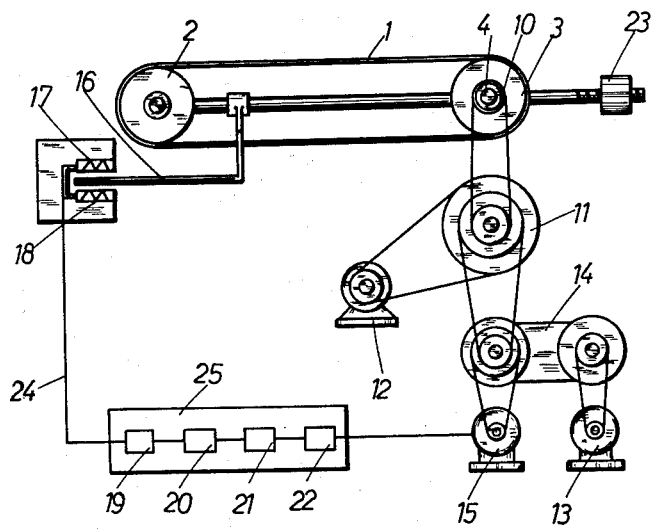
FIG. 2 shows schematically the beam balance part and drive and control means thereof of a further embodiment of the apparatus of the invention; inessential parts of a band balance have been omitted for the sake of clarity and an infinitely variable transmission of the endless conveyor belt and pump drive is controlled in dependence on the deflections of the band balance.
Figure 3:
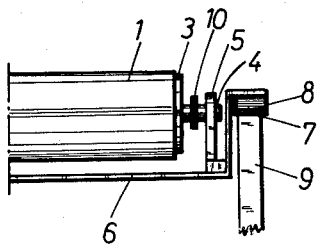
FIG. 3 shows a partial view of the roller bearing of the endless conveyor belt as an example of the coaxial arrangement of said one roller of the endless conveyor belt with the pivot of the band balance.

The drawing illustrates an apparatus comprising an endless conveyor belt 1 which runs over two rollers 2 and 3 arranged on the one arm of a beam balance thus forming a band balance. A shaft 4 of the roller 3 is arranged coaxially with the axis of rotation of the band balance. A bearing block 5 for the roller 3 is arranged on the balance beam 6 in such a manner that a prolongation of the shaft 4 would pass through the rim 7 of the knife edge 8 with which the beam 6 lies on a support 9. The roller 3 is driven by a drive wheel 10 which in this embodiment represents the transmission means for transmitting the kinetic energy from the drive means arranged outside of the weighing system of the beam balance into the same. The drive wheel 10 transmits the movement from a further transmission means 11 which at the same time drives a pump 12. The transmission means 11 is driven by a motor 13 by way of an infinitely variable transmission 14 which in turn is adjusted by a servo motor 15. An arm 16 is arranged on a lever arm of the balance beam on which the endless conveyor belt 1 is arranged. In the embodiment of FIG. 1, the arm 16 oscillates between two electric switch contacts arranged in the device 23 thus closing an electric circuit both in the upper and in the lower extreme position. In the embodiment of FIG. 2, the arm 16 oscillates between two photo-electric cells 17 and 18 arranged in a similar assembly. This assembly 23 is connected by a cable 24 with the control assembly 25 which houses an amplifier 19, an impulse duration transmitter 20, an impulse sequence transmitter 21, and a reversing switch 22, and which is connected with the servo motor 15 for controlling the operation of the same. In the embodiment of FIG. 1, the loose solid material such as wood chips is delivered to the endless conveyor belt 1 by means of a conveyor belt 26 which is driven by a motor 29 by way of an infinitely variable transmission 27. This transmission gear 27 may be adjusted manually by means of the drive wheel 28.

The loose solid material is dropped for instance from a hopper to the conveyor belt 26 near its edge 26a. It is carried towards its edge 26b where it drops to the endless conveyor belt 1 near its edge 1a. After being weighed the loose solid material drops over the edge 1b onto a further conveyor means or directly into a vessel where it is processed. The liquid admixed with said loose solid material is taken up through pipe 12a, conveyed by the pump 12 and delivered by a pipe 12b which may be connected with a further pipe or with the inlet of the processing vessel. If too much of the loose solid material is delivered to the endless conveyor belt 1 the arm 16 is lowered thus connecting the lower switch contacts of 23 or, in the embodiment of FIG. 2 respectively, covering the photo-electric cell 18. By way of the control assembly 25 the servo motor 15 actuates the adjustable transmission 14 to accelerate the endless conveyor belt 1 and the pump 12 by way of the transmission 11. If sufficient loose solid material is delivered to the endless conveyor belt 1 the servo motor is actuated in the opposite sense of rotation by the upper switch contacts of 23 or, respectively, by the photo-electric cell 17 by way of the electric circuit 24, 19–22 until the speed of the endless conveyor belt 1 is reduced to a level at which the load on the belt 1 causes the balance beam to swing back to the zero position, with the result that the rate of delivery of liquid is also reduced since the speed of rotation of the pump 12 is reduced by the same proportion. The transmission means 11 may be used to drive a dosing apparatus for loose solid material or several pumps and/or dosing devices for loose solid materials instead of the pump 12.

If the drive means 13 and the infinitely variable transmission assembly 14–15 are arranged on the free lever arm of the beam balance, the counterweight 23 may be omitted. In that case, the transmission means 11 situated outside the weighing system is omitted, and the pump 12 is then driven directly by the drive wheel 1 which acts as transmission or by some other drive wheel arranged on the shaft 4 of the roller 3. If other dosing devices are to be controlled in addition to the pump 12, another suitable transmission means for driving these additional dosing devices may be arranged between the roller 3 and the pump 12.

If the delivery of loose solid material to the endless conveyor belt 1 is controlled in dependence on the deflection of the arm 16, the reversing switch 22 is connected with the servo motor 15 which is arranged at the side of the infinitely variable transmission 27 to drive the wheel 28 thereof thus adjusting the infinitely variable transmission 27 between the delivery belt 26 and the drive 29 for this belt. The speed of the conveyor belt 1 may then be kept constant by manual adjustment of the transmission 14.

What we claim is:

1. An apparatus for dosing a loose solid material and at least one further pourable material at continuously constant proportions, comprising, in combination, a beam balance on the beam of which an endless conveyor belt running over two rollers is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an electric control means for registering the deflections of the beam of said beam balance from its zero position, thereby controlling the action of said drive means for adjusting said infinitely variable transmission gear.

2. An apparatus for dosing a loose solid material and at least one further pourable material at continuously constant proportions, comprising, in combination, a beam balance on the one arm of the beam of which an endless conveyor belt running over two rollers is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an electric control means for registering the deflections of the beam of said beam balance from its zero position, thereby controlling the action of said drive means for adjusting said infinitely variable transmission gear.

3. An apparatus for dosing a loose solid material and at least one further pourable material at continuously constant proportions, comprising, in combination, a beam balance on the one arm of the beam of which an endless conveyor belt running over two rollers is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, said drive means being arranged as a counter-weight on the other arm of the beam of said beam balance, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an electric control means for registering the deflections of the beam of said balance from its zero position, thereby controlling the action of said drive means for adjusting said infinitely variable transmission gear.

4. An apparatus for dosing a loose solid material and at least one further pourable material at continuously constant proportions, comprising, in combination, a beam balance on the one arm of the beam of which an endless conveyor belt running over two rollers in the direction of the longitudinal axis of the beam of said beam balance is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an electric control means for registering the deflections of the beam of said beam balance from its zero position, thereby controlling the action of said drive means for adjusting said infinitely variable transmission gear.

5. An apparatus for dosing a loose solid material and at least one further pourable material at continuously constant proportions, comprising, in combination, a beam balance on the one arm of the beam of which an endless conveyor belt running over two rollers in the longitudinal direction of the beam of said beam balance is provided, the axis of rotation of one of said rollers coinciding with the axis of rotation of said beam balance, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose material onto said endless conveyor belt close to the axis of rotation of said beam balance, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation coinciding with the axis of rotation of said beam balance, a drive means for adjusting one of said infinitely variable transmission gears, and an electric control means for registering the deflections of the beam of said beam balance from its zero position, thereby controlling the action of said drive means for adjusting said infinitely variable transmission gear.

6. An apparatus for dosing a loose solid material and at least one further pourable material at continuously constant proportions, comprising, in combination, a beam balance on the beam of which an endless conveyor belt running over two rollers is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an arm connected with the one arm of said beam balance, said arm extending between two photoelectric cells arranged at a predetermined distance from each other and connected with means for controlling the action and direction of rotation of said drive means for adjusting said infinitely variable transmission gear.

7. An apparatus for dosing a loose solid material and at least one further pourable material at continuously constant proportions, comprising, in combination, a beam balance on the beam of which an endless conveyor belt running over two rollers is provided, at least one further dosing means for the further pourable materials to be dosed, said dosing means being arranged outside the weighing system of said beam balance, a drive means common to said endless conveyor belt and said further dosing means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said further dosing means arranged outside the weighing system of said beam balance, said rotatable transmission means being arranged with its axis of rotation parallel and close to the axis of rotation of said beam balance, a drive means for adjusting one of said infinitely variable transmission gears, and an arm connected with the one arm of said beam balance, the end of said arm being electrically conductive and said arm extending with said conductive end between two pairs of electric switch contacts arranged at a predetermined distance from each other so that said conductive end of said arm can connect the two electric switch contacts of a pair of said contacts, and said pairs of contacts being connected with means for controlling the action and direction of rotation of said drive means for adjusting said infinitely variable transmission gear.

8. An apparatus for dosing a loose solid material and a liquid at continuously constant proportions, comprising, in combination, a beam balance on the one arm of the beam of which an endless conveyor belt running over two rollers in the longitudinal direction of the beam of said beam balance is provided, a pump means for the liquid to be dosed, said pump means being arranged outside the weighing system of said beam balance, a drive means common to said endless conveyor belt and said pump means comprising a motor and an infinitely variable transmission gear, means for feeding said loose solid material onto said endless conveyor belt, a drive means for said feeding means comprising a motor and an infinitely variable transmission gear, a rotatable transmission means for transmitting the kinetic energy between said endless conveyor belt on said beam balance and said pump means arranged outside the weighing system of said beam balance, said rotatable transmission means being arrranged with its axis of rotation parallel and close to the axis of rotation of said beam balance, a drive means for adjusting one of said infinitely variable transmission gears, and an electric control means for registering the deflections of the beam of said beam balance from its zero position, thereby controlling the action of said drive means for adjusting said infinitely variable transmission gear.

No references cited.

LOUIS J. DEMBO, *Primary Examiner.*